(12) United States Patent
Richardson et al.

(10) Patent No.: US 6,969,551 B2
(45) Date of Patent: Nov. 29, 2005

(54) METHOD AND ASSEMBLY FOR FASTENING AND REINFORCING A STRUCTURAL MEMBER

(75) Inventors: Henry E. Richardson, Washington, MI (US); Dean Jeffrey Schneider, Washington, MI (US)

(73) Assignee: L & L Products, Inc., Romeo, MI (US)

( * ) Notice: Subject to any disclaimer, the term of this patent is extended or adjusted under 35 U.S.C. 154(b) by 0 days.

(21) Appl. No.: 10/404,831

(22) Filed: Apr. 1, 2003

(65) Prior Publication Data

US 2004/0018341 A1    Jan. 29, 2004

Related U.S. Application Data

(60) Provisional application No. 60/373,241, filed on Apr. 17, 2002.

(51) Int. Cl.$^7$ .............................. B32B 3/26; B32B 3/10; B60R 27/00
(52) U.S. Cl. ...................... 428/304.4; 428/131; 428/99; 428/119; 428/71; 428/122; 428/309.9; 296/187.02; 296/187.03
(58) Field of Search .................... 428/99, 119, 131, 428/71, 122, 304.4, 309.9; 296/187.02, 187.03

(56) References Cited

U.S. PATENT DOCUMENTS

| | | |
|---|---|---|
| 3,162,086 A | 12/1964 | Wells et al. |
| 3,400,182 A | 9/1968 | Kolt |
| 3,851,794 A | 12/1974 | Hehl |
| 4,128,069 A | 12/1978 | Kotcharian |
| 4,290,536 A | 9/1981 | Morel |
| 4,440,434 A | 4/1984 | Celli |
| 4,463,870 A | 8/1984 | Coburn, Jr. et al. |
| 4,610,836 A | 9/1986 | Wycech |
| 4,751,249 A | 6/1988 | Wycech |
| 4,769,391 A | 9/1988 | Wycech |
| 4,813,690 A | 3/1989 | Coburn, Jr. |
| 4,836,516 A | 6/1989 | Wycech |
| 4,853,270 A | 8/1989 | Wycech |
| 4,861,097 A | 8/1989 | Wycech |
| 4,901,395 A | 2/1990 | Semrau |
| 4,901,500 A | 2/1990 | Wycech |
| 4,923,902 A | 5/1990 | Wycech |
| 4,978,562 A | 12/1990 | Wycech |
| 4,984,406 A | 1/1991 | Friesen |
| 5,124,186 A | 6/1992 | Wycech |
| 5,160,465 A | 11/1992 | Soderberg |

(Continued)

FOREIGN PATENT DOCUMENTS

AT    G 93 20 333.0    9/1994

(Continued)

OTHER PUBLICATIONS

U.S. Appl. No. 09/459,756, filed Dec. 10, 1999.

(Continued)

*Primary Examiner*—Harold Pyon
*Assistant Examiner*—Patricia L. Nordmeyer
(74) *Attorney, Agent, or Firm*—Dobrusin & Thennisch PC (57) ABSTRACT

The invention provides a method and assembly for fastening and reinforcing a structural member (e.g., an automotive vehicle pillar, such as an automotive "B" pillar). The assembly preferably includes a structural member having a first and a second portion defining a cavity therebetween. An expandable reinforcement material, such as an epoxy-based reinforcement material, and a spacer are typically disposed within the cavity. The assembly also typically includes a fastener or fastening assembly. In operation, the spacer preferably assists in supporting the first and second portions of the structural member during changes of state (e.g., softening) of the reinforcement material.

21 Claims, 8 Drawing Sheets

U.S. PATENT DOCUMENTS

| | | |
|---|---|---|
| 5,266,133 A | 11/1993 | Hanley et al. |
| 5,288,538 A | 2/1994 | Spears |
| 5,358,397 A | 10/1994 | Ligon et al. |
| 5,506,025 A | 4/1996 | Otto et al. |
| 5,575,526 A | 11/1996 | Wycech |
| 5,631,027 A | 5/1997 | Takabatake |
| 5,725,272 A | 3/1998 | Jones |
| 5,755,486 A | 5/1998 | Wycech |
| 5,766,719 A | 6/1998 | Rimkus |
| 5,806,915 A | 9/1998 | Takabatake |
| 5,829,482 A | 11/1998 | Takabatake |
| 5,888,600 A | 3/1999 | Wycech |
| 5,931,474 A | 8/1999 | Chang et al. |
| 5,932,680 A | 8/1999 | Heider |
| 5,937,486 A | 8/1999 | Bockenheimer |
| 5,985,435 A | 11/1999 | Czaplicki et al. |
| 5,992,923 A | 11/1999 | Wycech |
| 6,003,274 A | 12/1999 | Wycech |
| 6,006,484 A | 12/1999 | Geissbuhler |
| 6,033,300 A | 3/2000 | Schneider |
| 6,040,350 A | 3/2000 | Fukui |
| 6,053,210 A | 4/2000 | Chapman et al. |
| 6,059,342 A | 5/2000 | Kawai et al. |
| 6,068,424 A | 5/2000 | Wycech |
| 6,073,991 A | 6/2000 | Naert |
| 6,079,180 A | 6/2000 | Wycech |
| 6,092,864 A | 7/2000 | Wycech et al. |
| 6,096,403 A | 8/2000 | Wycech |
| 6,099,948 A | 8/2000 | Paver, Jr. |
| 6,103,341 A | 8/2000 | Barz et al. |
| 6,129,410 A | 10/2000 | Kosaraju et al. |
| 6,131,897 A | 10/2000 | Barz et al. |
| 6,135,542 A | 10/2000 | Emmelmann et al. |
| 6,146,565 A | 11/2000 | Keller |
| 6,149,227 A | 11/2000 | Wycech |
| 6,150,428 A | 11/2000 | Hanley, IV et al. |
| 6,165,588 A | 12/2000 | Wycech |
| 6,168,226 B1 | 1/2001 | Wycech |
| 6,189,953 B1 | 2/2001 | Wycech |
| 6,196,621 B1 | 3/2001 | VanAssche et al. |
| 6,199,940 B1 | 3/2001 | Hopton et al. |
| 6,207,244 B1 | 3/2001 | Hesch |
| 6,233,826 B1 | 5/2001 | Wycech |
| 6,237,304 B1 | 5/2001 | Wycech |
| 6,244,601 B1 | 6/2001 | Buchholz et al. |
| 6,247,287 B1 | 6/2001 | Takabatake |
| 6,250,410 B1 | 6/2001 | Balestrini et al. |
| 6,253,524 B1 | 7/2001 | Hopton et al. |
| 6,263,635 B1 | 7/2001 | Czaplicki |
| 6,270,600 B1 | 8/2001 | Wycech |
| 6,272,809 B1 | 8/2001 | Wycech |
| 6,276,105 B1 | 8/2001 | Wycech |
| 6,281,260 B1 | 8/2001 | Hanley, IV et al. |
| 6,287,666 B1 | 9/2001 | Wycech |
| 6,296,298 B1 | 10/2001 | Barz |
| 6,305,136 B1 | 10/2001 | Hopton et al. |
| 6,311,452 B1 | 11/2001 | Barz et al. |
| 6,315,938 B1 | 11/2001 | Jandali |
| 6,319,964 B1 | 11/2001 | Blank et al. |
| 6,321,793 B1 | 11/2001 | Czaplicki et al. |
| 6,332,731 B1 | 12/2001 | Wycech |
| 6,341,467 B1 | 1/2002 | Wycech |
| 6,357,819 B1 | 3/2002 | Yoshino |
| 6,358,584 B1 | 3/2002 | Czaplicki |
| 6,368,438 B1 | 4/2002 | Chang et al. |
| 6,372,334 B1 | 4/2002 | Wycech |
| D457,120 S | 5/2002 | Broccardo et al. |
| 6,382,635 B1 | 5/2002 | Fitzgerald |
| 6,383,610 B1 | 5/2002 | Barz et al. |
| 6,389,775 B1 | 5/2002 | Steiner et al. |
| 6,406,078 B1 | 6/2002 | Wycech |
| 6,413,611 B1 | 7/2002 | Roberts et al. |
| 6,419,305 B1 | 7/2002 | Larsen |
| 6,422,575 B1 | 7/2002 | Czaplicki et al. |
| H2047 H | 9/2002 | Harrison et al. |
| 6,444,713 B1 | 9/2002 | Pachl et al. |
| 6,455,146 B1 | 9/2002 | Fitzgerald |
| 6,467,834 B1 | 10/2002 | Barz et al. |
| 6,471,285 B1 | 10/2002 | Czaplicki et al. |
| 6,474,722 B2 | 11/2002 | Barz |
| 6,474,723 B2 | 11/2002 | Czaplicki et al. |
| 6,475,577 B1 | 11/2002 | Hopton et al. |
| 6,482,486 B1 | 11/2002 | Czaplicki et al. |
| 6,482,496 B1 | 11/2002 | Wycech |
| 6,491,336 B1 | 12/2002 | Beckmann et al. |
| 6,502,821 B2 | 1/2003 | Schneider |
| 6,519,854 B2 | 2/2003 | Blank |
| 6,523,857 B1 | 2/2003 | Hopton et al. |
| 6,523,884 B2 | 2/2003 | Czaplicki et al. |
| 6,546,693 B2 | 4/2003 | Wycech |
| 6,561,571 B1 | 5/2003 | Brennecke |
| 6,573,309 B1 | 6/2003 | Reitenbach et al. |
| 6,575,526 B2 | 6/2003 | Czaplicki et al. |
| 6,607,238 B2 | 8/2003 | Barz |
| 6,619,727 B1 | 9/2003 | Barz et al. |
| 6,634,698 B2 | 10/2003 | Kleino |
| 6,641,208 B2 | 11/2003 | Czaplicki et al. |
| 6,668,457 B1 | 12/2003 | Czaplicki |
| 6,691,468 B2 | 2/2004 | Helferty |
| 6,692,347 B1 | 2/2004 | Schneider |
| 6,708,979 B2 | 3/2004 | Stratman et al. |
| 6,729,425 B2 | 5/2004 | Schneider et al. |
| 6,748,667 B2 | 6/2004 | Sevastian |
| 6,777,049 B2 | 8/2004 | Sheldon et al. |
| 6,786,533 B2 | 9/2004 | Bock et al. |
| 6,793,274 B2 | 9/2004 | Riley et al. |
| 6,811,864 B2 | 11/2004 | Czaplicki et al. |
| 6,820,923 B1 | 11/2004 | Bock |
| 2001/0020794 A1 | 9/2001 | Ishikawa |
| 2001/0042353 A1 | 11/2001 | Honda et al. |
| 2002/0024233 A1 | 2/2002 | Kleino |
| 2002/0053179 A1 | 5/2002 | Wycech |
| 2002/0074827 A1 | 6/2002 | Fitzgerald et al. |
| 2003/0001469 A1 | 1/2003 | Hankins et al. |
| 2003/0039792 A1 | 2/2003 | Hable et al. |
| 2003/0042056 A1 | 3/2003 | Schneider et al. |
| 2003/0057737 A1 | 3/2003 | Bock et al. |
| 2003/0069335 A1 | 4/2003 | Czaplicki et al. |
| 2003/0090129 A1 | 5/2003 | Riley et al. |
| 2004/0011282 A1 | 1/2004 | Myers et al. |
| 2004/0074150 A1 | 4/2004 | Wycech |
| 2004/0079478 A1 | 4/2004 | Merz |
| 2004/0135058 A1 | 7/2004 | Wycech |

FOREIGN PATENT DOCUMENTS

| | | |
|---|---|---|
| DE | 29 19 046 | 11/1980 |
| DE | 40 28 895 C1 | 2/1992 |
| DE | 196 44 047 A1 | 5/1998 |
| DE | 197 03 429 A1 | 8/1998 |
| DE | 198 12 288 C1 | 5/1999 |
| DE | 198 56 255 C1 | 1/2000 |
| DE | 198 58 903 A1 | 6/2000 |
| EP | 0 236 291 A2 | 2/1987 |
| EP | 0 414 302 A1 | 2/1991 |
| EP | 0 453 777 A2 | 10/1991 |
| EP | 0 679 501 A1 | 11/1995 |
| EP | 0 775 721 A1 | 5/1997 |
| EP | 0 611 778 B1 | 9/1997 |
| EP | 0 891 918 A1 | 1/1999 |
| EP | 0 893 331 A1 | 1/1999 |
| EP | 0 893 332 A1 | 1/1999 |
| EP | 0 697 956 B1 | 6/1999 |
| EP | 1 084 816 A2 | 3/2001 |

| | | |
|---|---|---|
| EP | 1 122 156 A2 | 8/2001 |
| EP | 0 893 332 B1 | 3/2002 |
| EP | 1 208 954 A2 | 5/2002 |
| EP | 1 362 683 A2 | 11/2003 |
| EP | 1 362 769 A1 | 11/2003 |
| EP | 1 419 954 A2 | 5/2004 |
| EP | 1 428 744 A1 | 6/2004 |
| EP | 1 475 295 A2 | 11/2004 |
| FR | 2 749 263 | 12/1997 |
| FR | 2 780 952 | 1/2000 |
| GB | 628863 | 9/1949 |
| GB | 2 156 412 A | 10/1985 |
| GB | 2 197 267 A | 5/1988 |
| GB | 2 375 328 A | 11/2002 |
| JP | 01069308 | 3/1989 |
| JP | 02206537 | 8/1990 |
| JP | 7-31569 | 6/1995 |
| JP | 10053156 | 2/1998 |
| JP | 410071628 A | 3/1998 |
| JP | 2000052444 A | 2/2000 |
| JP | 2001062833 A | 3/2001 |
| JP | 2001074011 | 3/2001 |
| JP | 2001191949 A | 7/2001 |
| JP | 2001199362 A | 7/2001 |
| JP | 2002331960 | 11/2002 |
| WO | WO 95/32110 | 11/1995 |
| WO | WO 97/02967 | 1/1997 |
| WO | WO 97/43501 | 11/1997 |
| WO | WO 98/36944 | 8/1998 |
| WO | WO 98/50221 | 11/1998 |
| WO | WO 99/08854 | 2/1999 |
| WO | WO 99/28575 | 6/1999 |
| WO | WO 99/48746 | 9/1999 |
| WO | WO 99/50057 | 10/1999 |
| WO | WO 99/61216 | 12/1999 |
| WO | WO 00/03894 | 1/2000 |
| WO | WO 00/05320 | 2/2000 |
| WO | WO 00/13958 | 3/2000 |
| WO | WO 00/27920 | 5/2000 |
| WO | WO 00/37302 | 6/2000 |
| WO | WO 00/40815 | 7/2000 |
| WO | WO 00/43254 | 7/2000 |
| WO | WO 00/46461 | 8/2000 |
| WO | WO 00/55444 | 9/2000 |
| WO | WO 00/68041 | 11/2000 |
| WO | WO 01/54936 | 8/2001 |
| WO | WO 01/56845 | 8/2001 |
| WO | WO 01/71225 | 9/2001 |
| WO | WO 01/83206 | 11/2001 |
| WO | WO 01/88033 | 11/2001 |
| WO | WO 03/042024 A1 | 5/2003 |
| WO | WO 03/051676 A1 | 6/2003 |
| WO | WO 03/061934 | 7/2003 |
| WO | WO 03/089221 A1 | 10/2003 |

OTHER PUBLICATIONS

U.S. Appl. No. 09/631,211, filed Aug. 3, 2000.
U.S. Appl. No. 09/655,965, filed Sep. 6, 2000.
U.S. Appl. No. 10/233,919, filed Sep. 3, 2002.
U.S. Appl. No. 10/103,029, filed Mar. 21, 2002.
U.S. Appl. No. 10/008,194, filed Nov. 8, 2001.
U.S. Appl. No. 10/008,505, filed Nov. 8, 2001.
U.S. Appl. No. 10/098,952, filed Mar. 15, 2002.
U.S. Appl. No. 10/386,287, filed Mar. 11, 2003.
U.S. Appl. No. 10/339,112, filed Jan. 9, 2003.
U.S. Appl. No. 10/342,025, filed Jan. 14, 2003.
U.S. Appl. No. 10/337,446, filed Jan. 7, 2003.
Copending European Application Ser. No. 0130439.3 filed Dec. 20, 2001.
Born, Peter and Bernd Mayer, "Structural Bonding in Automotive Applications", AutoTechnology, Apr. 2004, pp. 44-47.
European Search Report dated Sep. 24, 2004 for Application No. 03076126.
Copending GB Application Ser. No. 0300159.1 filed Jan. 6, 2003.

METHOD AND ASSEMBLY FOR FASTENING AND REINFORCING A STRUCTURAL MEMBER

CLAIM OF BENEFIT OF FILING DATE

The present application claims the benefit of the filing date of U.S. Provisional Application Ser. No. 60/373,241 (filed Apr. 17, 2002), hereby incorporated by reference.

FIELD OF THE INVENTION

The present invention relates generally to a method and assembly for fastening and reinforcing a structural member in an automotive vehicle. More particularly, the present invention relates to a method and assembly for fastening two portions of a structural member together and for reinforcing the structural member to increase the strength, stiffness and/or structural integrity of the structural member.

BACKGROUND OF THE INVENTION

For many years the transportation industry and other industries have been concerned with designing reinforced structural members that do not add significantly to the weight of a vehicle or other article. For example, U.S. Pat. Nos. 5,755,486; 4,901,500; and 4,751,249 describe prior art reinforcing devices. While these prior art devices may be advantageous in some circumstances, difficulties may be encountered when reinforcement materials or members are used in conjunction with fasteners, fastening assemblies or other like devices. For example, and without limitation, some reinforcement materials change physical states (e.g., soften) during manufacture of articles (e.g., automotive vehicles) thereby causing the reinforcement materials to expand, contract, flow or the like. In turn, these changes can have detrimental effects on devices such as fasteners, which are being used to assemble, or fasten members together or otherwise function within the articles. Thus, there is a need for a method and assembly for reinforcing structural members wherein the functions of other devices such as fasteners that accompany the structural members remain substantially unaffected or enhanced.

In the automotive industry, in particular, there is a need for a relatively low cost method and assembly for reinforcing automotive pillar structures in a vehicle wherein the method and assembly accommodates or includes one or more fasteners or fastening assemblies that are assembled to the pillar structures.

SUMMARY OF THE INVENTION

The present invention is directed to a method and assembly for fastening and reinforcing a structural member. The assembly preferably includes one or more members or portions, which are combined, preferably with a fastener (e.g., a fastening member or fastening assembly), to form the structural member. The assembly also includes a reinforcement material and a spacer wherein the spacer may be part of the members, portions, fastener or a combination thereof. The reinforcement material and spacer are applied either together as a composite or separately to the structural member. In operation, the spacer preferably maintains walls of the structural member spaced apart from each other thereby assisting the fastener to securely attach itself to the structural member as the reinforcement material changes states (e.g., softens).

BRIEF DESCRIPTION OF THE DRAWINGS

The features and inventive aspects of the present invention will become more apparent upon reading the following detailed description, claims, and drawings, of which the following is a brief description:

DETAILED DESCRIPTION OF THE PREFERRED EMBODIMENT

The present invention generally provides an assembly and method for fastening, reinforcing or both of a structural member. Preferably the assembly and method provide one or a combination of the following:

(1) a structural member having a cavity, the structural member preferably including a first portion and a second portion defining the cavity therebetween;

(2) a fastener attached to the structural member, the fastener preferably providing a force urging the first portion toward the second portion across the cavity;

(3) a reinforcement material that is activatible to change states (e.g., flow, soften, harden), the reinforcement material preferably disposed in the cavity; and (4) one or more spacers for assisting in supporting the first portion and second portion against the force provided by the fastener, the one or more spacers preferably providing such support as the reinforcement material changes states.

Figure 1:
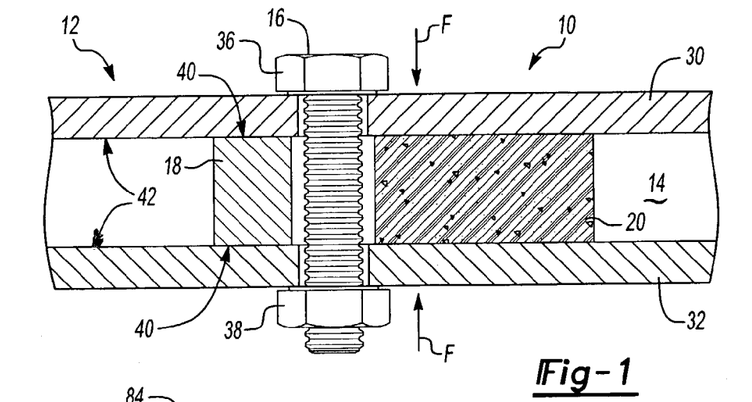
FIG. 1 illustrates a sectional view of an exemplary embodiment of a structurally reinforced assembly in accordance with an aspect of the present invention.

Referring to FIG. 1, there is illustrated an exemplary structurally reinforced assembly 10 according to the present invention. The assembly 10 includes a structural member 12 defining a cavity 14, and a fastener 16 attached to the structural member 12. As shown, a spacer 18 and a reinforcement material 20 are disposed within the cavity 14.

The structural member 12 of the present invention may find utility in a variety of articles of manufacture. For example, and without limitation, the structural member 12 may be integrated into furniture, appliances, transportation vehicles, buildings or other items, which preferably exhibit structural integrity against one or mores forces during their use. In one preferred embodiment, the structural member 12 is a portion of an automotive vehicle (not shown). Exemplary structural members of automotive vehicles include door beams, door beam assemblies, door hinges, pillars, frames, rails, door strikers, hinges, rocker panels, cargo doors, hatchbacks, tail gates, and other portions of automotive vehicles. As will be recognized, included in the roof and pillar structure may also be windows, sunroofs or other removable tops, vehicle doors and door components, headliners (with or without overhead accessories), or the like. In one highly preferred embodiment, the structural member 12 may be considered a pillar structure (e.g., an A, B or C pillar), a door hinge, a door striker, combinations thereof or the like of an automotive vehicle. In FIG. 1, the structural member 12 includes a first portion 30 and a second portion 32 with the cavity 14 disposed therebetween. The first portion 30 and second portion 32 may be separate components (e.g., members), which are assembled together to form the structural member or, alternatively, the first portion 30 and second portion 32 may be a single integrated component.

The fastener 16 of the assembly 10 may be provided in a variety of shapes and configurations. The fastener 16 may be any one of a variety of known fasteners or fastener assemblies such as a nut and bolt assembly, a clip, a rivet, a clamp, a lug, a screw, a clevis or the like. Alternatively, the fastener 16 may be a novel fastener or fastening assembly or a fastener or fastening assembly that has been configured or designed for a certain application. According to one preferred embodiment of the invention, the fastener includes at least one member 36 that is threaded and which can be threadably attached to a second threaded member. In FIG. 1, the second threaded member 38 is shown as a second component of the fastener 16, however, it shall be understood that the second threaded member may also be a threaded part of the first and second portions 30,32, a part or the entirety of the spacer 18, a part or the entirety of the reinforcement material 20 or the like. As shown in FIG. 1, the fastener 16 preferably provides one more forces (F) urging the portions 30, 32 of the structural member 12 together across the cavity 14.

The spacer 18 as defined herein may be configured in any of a variety of shapes, sizes or the like, which preferably at least assist in providing support for the structural member 12 (i.e., the first and second portions) against the forces (F) supplied by the fastener 16. Preferably, the spacer 18 has spaced apart surfaces 40 that are configured for contacting one or more walls 42 defining the cavity 14 such that the spacer 18 is able to substantially maintain the first and second portions 30, 32 spaced apart by a predetermined distance. As shown in FIG. 1, the spacer 18 is a separate component, however, in alternative embodiments, the spacer 18 may be integrated into the structural member 12, the fastener 16 (e.g., as part of a fastener assembly), the reinforcement material 20 or a combination thereof.

The portions 30, 32, the spacer 18 and the fastener 16 may be formed of a variety of materials such as a polymeric material, plastics, metals or the like. According to one preferred embodiment, each of the components is at least partially or substantially entirely formed of aluminum, magnesium, steel, other metals, combinations thereof or the like.

Preferably, the reinforcement material 20 is a high compressive strength heat activated reinforcement material having foamable characteristics. The material may be generally dry to the touch or tacky and can be placed intermediate the members 62, 64 in any form of desired pattern, placement, or thickness, but is preferably a substantially uniform thickness. One exemplary expandable material 34 is L-5204 structural foam available through L&L Products, Inc. of Romeo, Mich.

Though other heat activated materials are possible for the reinforcement material 20, a preferred heat activated material is an expandable plastic, and preferably one that is foamable. A particularly preferred material is an epoxy-based structural foam. For example, without limitation, the structural foam may be an epoxy-based material, including an ethylene copolymer or terpolymer that may possess an alpha-olefin. As a copolymer or terpolymer, the polymer is composed of two or three different monomers, i.e., small molecules with high chemical reactivity that are capable of linking up with similar molecules.

A number of epoxy-based structural reinforcing foams are known in the art and may also be used to produce the structural foam. A typical structural foam includes a polymeric base material, such as an epoxy resin or ethylene-based polymer which, when compounded with appropriate ingredients (typically a blowing and curing agent), expands and cures in a reliable and predicable manner upon the application of heat or the occurrence of a particular ambient condition. From a chemical standpoint for a thermally-activated material, the structural foam is usually initially processed as a flowable thermoplastic material before curing. It will cross-link upon curing, which makes the material incapable of further flow.

An example of a preferred structural foam formulation is an epoxy-based material that is commercially available from L&L Products of Romeo, Mich., under the designations L5206, L5207, L5208, L5209, XP321 and XP721. One advantage of the preferred structural foam materials over prior art materials is that the preferred materials can be processed in several ways. The preferred materials can be processed by injection molding, extrusion compression molding or with a mini-applicator. This enables the formation and creation of part designs that exceed the capability of most prior art materials. In one preferred embodiment, the structural foam (in its uncured state) generally is dry or relatively free of tack to the touch and can easily be attached to the members 62, 64 through fastening means which are well known in the art.

While the preferred materials for fabricating the reinforcement material 20 have been disclosed, the reinforcement material 20 can be formed of other materials provided that the material selected is heat-activated or otherwise activated by an ambient condition (e.g. moisture, pressure, time or the like) and cures in a predictable and reliable manner under appropriate conditions for the selected application. One such material is the epoxy based resin disclosed in U.S. Pat. No. 6,131,897, the teachings of which are incorporated herein by reference, filed with the United States Patent and Trademark Office on Mar. 8, 1999 by the assignee of this application. Some other possible materials include, but are not limited to, polyolefin materials, copolymers and terpolymers with at least one monomer type an alpha-olefin, phenol/formaldehyde materials, phenoxy materials, and polyurethane materials with high glass transition temperatures. See also, U.S. Pat. Nos. 5,766,719; 5,755,486; 5,575,526; and 5,932,680, (incorporated by reference). In general, the desired characteristics of the structural foam include relatively high stiffness, high strength, high glass transition temperature (typically greater than 70 degrees Celsius), and good corrosion resistance properties. In this manner, the material does not generally interfere with the materials systems employed by automobile manufacturers.

In applications where the reinforcement material 20 is a heat activated, thermally expanding material, an important consideration involved with the selection and formulation of the material comprising the structural foam is the temperature at which a material reaction or expansion, and possibly curing, will take place. For instance, in most applications, it is undesirable for the material to be reactive at room temperature or otherwise at the ambient temperature in a production line environment. More typically, the structural foam becomes reactive at higher processing temperatures, such as those encountered in an automobile assembly plant, when the foam is processed along with the automobile components at elevated temperatures or at higher applied energy levels, e.g., during painting preparation steps. While temperatures encountered in an automobile assembly operation may be in the range of about 148.89° C. to 204.44° C. (about 300° F. to 400° F.), body and paint shop applications are commonly about 93.33° C. (about 200° F.) or slightly higher. If needed, blowing agent activators can be incorporated into the composition to cause expansion at different temperatures outside the above ranges.

Generally, suitable expandable foams have a range of expansion ranging from approximately 0 to over 1000 percent. The level of expansion of the structural foam 34 may be increased to as high as 1500 percent or more. Typically, strength is obtained from products that possess low expansion.

Some other possible materials include, but are not limited to, polyolefin materials, copolymers and terpolymers with at least one monomer type an alpha-olefin, phenol/formaldehyde materials, phenoxy materials, and polyurethane. See also, U.S. Pat. Nos. 5,266,133; 5,766,719; 5,755,486; 5,575,526; 5,932,680; and WO 00/27920 (PCT/US 99/24795) (all of which are expressly incorporated by reference). In general, the desired characteristics of the resulting material include relatively low glass transition point, and good corrosion resistance properties. In this manner, the material does not generally interfere with the materials systems employed by automobile manufacturers. Moreover, it will withstand the processing conditions typically encountered in the manufacture of a vehicle, such as the e-coat priming, cleaning and degreasing and other coating processes, as well as the painting operations encountered in final vehicle assembly.

In another embodiment, the reinforcement material 20 is provided in an encapsulated or partially encapsulated form, which may comprise a pellet, which includes an expandable foamable material, encapsulated or partially encapsulated in an adhesive shell. An example of one such system is disclosed in commonly owned, co-pending U.S. application Ser. No. 09/524,298 ("Expandable Pre-Formed Plug"), hereby incorporated by reference.

In addition, as discussed previously, preformed patterns may also be employed such as those made by extruding a sheet (having a flat or contoured surface) and then die cutting it according to a predetermined configuration in accordance with the chosen pillar structure or door beam, and applying it thereto.

The skilled artisan will appreciate that the system may be employed in combination with or as a component of a conventional sound blocking baffle, or a vehicle structural reinforcement system, such as is disclosed in commonly owned co-pending U.S. application Ser. Nos. 09/524,961 or 09/502,686 (hereby incorporated by reference).

Referring back to FIG. 1, the assembly 10 may be formed according to a variety of methods or protocols. According to one method, the reinforcement material 20 and spacer 18, either individually or in combination, are applied to (e.g., layer upon) one of the portions 30, 32 of the structural member 12 followed by applying (e.g., layering) the other of the portions 30, 32 to the reinforcement material 20. Thereafter, the fastener 16 is used to attach and preferably threadably fasten the portions 30, 32 of the structural member together. In alternative embodiments, spacer 18, reinforcement material 20 or both may be inserted into the cavity 14 before or after the fastener 16 has been attached to the structural member 12.

During or after formation of the assembly 10, the reinforcement material may be activated to change states (e.g., soften) as previously described above. Such a change in states might normally subject the fastener 16 to forces or a lack of support, which, in turn might lessen the ability of the fastener 16 to remain attached to the portions 30, 32 or attach the portions 30, 32 of the structural member 12 together. Advantageously, according to embodiments of the present invention, however, the spacer 18 can at least assist in supporting the portions 30, 32 of the structural member 12 during the change of states of the reinforcement material 20 thereby allowing the fastener 16 to maintain its ability to attach to the portions 30, 32 or attach the portions 30, 32 together. This advantage is realized with profundity for threadable fasteners wherein a softening of the reinforcment material 20 allows the portion 30, 32 of the structural member 12 to flex towards one another resulting in a torque loss of the threadable fasteners.

Referring to FIGS. 2–6, there are illustrated exemplary preferred embodiments of the assembly of the present invention. As shown, the embodiments are shown as applied to automotive pillar structures, particularly, B-pillars. However, it should be understood that the invention may be applied to various portions of an automotive vehicle or other articles of manufacture. Thus, the invention is not intended to be limited by its environment unless specified as such in the claims and there is no intention of surrendering any equivalents that the invention is entitled to.

Figure 2:
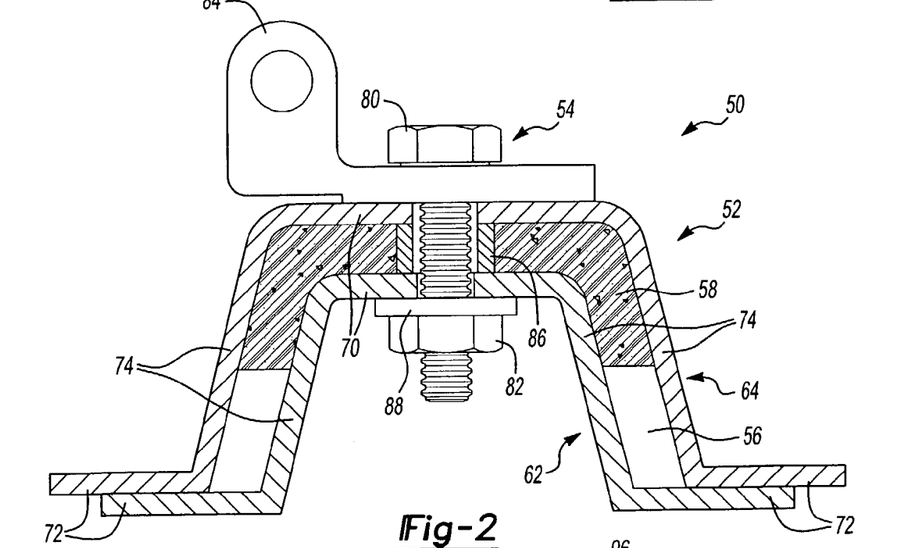
FIG. 2 illustrates a sectional view of another exemplary embodiment of a structurally reinforced assembly in accordance with an aspect of the present invention.

In FIG. 2, there is illustrated a reinforced structural assembly 50 having a structural member 52 (e.g., an automotive pillar) with one or more fastener assemblies 54 (only one being shown) attached thereto. The structural member 52 includes a first member 62 attached to a second member 64, which are at least partially attached or secured to each other with the fastener assembly 54. Preferably, the structural member 52 defines a cavity 56 and the reinforcement material 58 is disposed in the cavity 56.

In the embodiment shown, each of the first and second members 62, 64 of the structural member 52 include a central wall 70, a pair of flange members 72 and a pair of side walls 74, wherein the pair of side walls 74 respectively extend from the pair of flange members 72 to opposing sides of the central wall 70. The fastener assembly 54 includes a first threaded member 80 (e.g., a bolt), a second threaded member 82 (e.g., a nut), a hinge member 84, a spacer 86 and a washer 88. Of course, it is contemplated that the members 52, 62, 64, the reinforcement material 58 and the fastener assembly 54 may be provided in a variety of alternative shapes, configurations and sizes, and may be composed of alternative components which may correspond to each other or may not.

According to one exemplary assembly technique of the particular embodiment of FIG. 2, the reinforcement material 58 and the spacer 86 are applied to (e.g., layered upon) the first member 62 such that one or more openings (e.g., through-holes) of the reinforcement material 58, the spacer 86 and the central wall 70 of the first member 62 respectively align with each other. Preferably, the reinforcement material 58 is configured to substantially correspond and/or fit flush to the first member 62. Thereafter, the second member 64 and the hinge member 84 are applied to (e.g., layered upon) the first member 62 and the reinforcement material 58 such that one or more openings (e.g., through-holes) of the second member 64 and hinge member 84 align with the previously aligned one or more openings of the reinforcement material 58, the spacer 86 and the central wall 70 of the first member 62. Upon application of the second member 64 to the first member 62, the flange members 72 of the respective members 62, 64, preferably contact each other. Typically, the reinforcement material 58 and the spacer 86 are located at least partially between the members 62, 64. For assisting in securing the assembly 50 together, the first threaded member 80 is extended through the aligned openings of the second member 64, the hinge member 84, the reinforcement material 58, the spacer 86 and the central wall 70 of the first member 62 followed by threadably securing the second threaded member 82 to the first threaded member 80.

In operation, the reinforcement material 58 may undergo various state changes and may particularly undergo softening due to melting, flowing or the like, which may be followed by hardening, curing or the like. Advantageously, during such state changes, the spacer 86 assists in supporting the first and second members 62, 64 and particularly maintaining the central walls 70 of the members 62, 64 against any substantial flexing toward each other, which might occur in the absence of the spacer 86. In turn, the threaded members 80, 82 maintain substantially the same amount of fastening torque throughout the state changes of the reinforcement material 58 such that any potential loosening of the members 80, 82 is lessened.

Figure 2A:
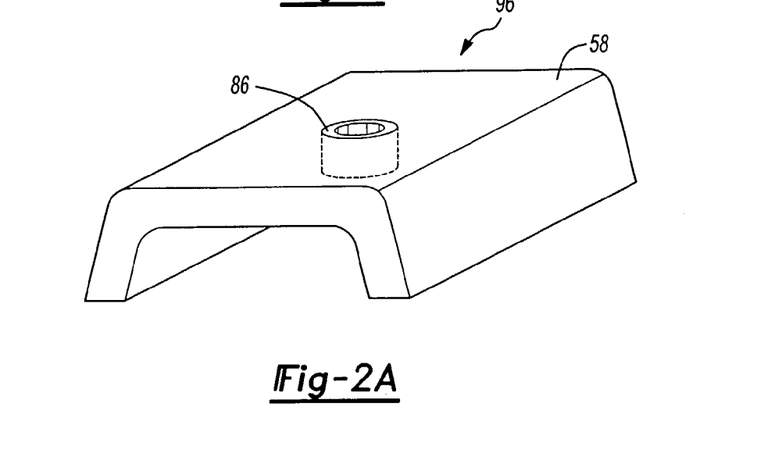
FIGS. 2(a)–2(b) illustrate perspective views of exemplary embodiments of composites suitable for use with the structurally reinforced assembly of FIG. 2.
Figure 2B:
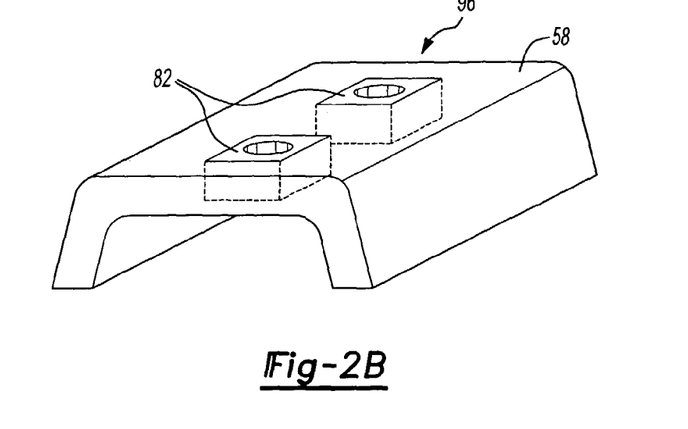

In highly preferred embodiments, and with reference to FIGS. 2(a) and 2(b), the one or more spacers 86 are integrated into the reinforcement material 58 to form reinforcement composites 96 appropriate for application to the first or second members 62, 64 as integrated units. Such composites 96 may be formed using a variety of methods and protocols. For example and without limitation, extrusion, molding or casting techniques may be employed for forming and integrating the composites 96. In one embodiment, the reinforcement material 86 is extruded and the spacers 86 are integrated into (e.g., mechanically or manually inserted within) the reinforcement material 58. Preferably, the spacers 86 are integrated to the reinforcement material 86 while the reinforcement material 58 is capable of wetting an outer peripheral surface of the spacers 86 (e.g., when the temperature of the reinforcement material is elevated). Such wetting can later (e.g., upon lowering the temperature of the reinforcement material) allow the reinforcement material 58 to at least partially adhere to the spacers 86.

Figure 2C:
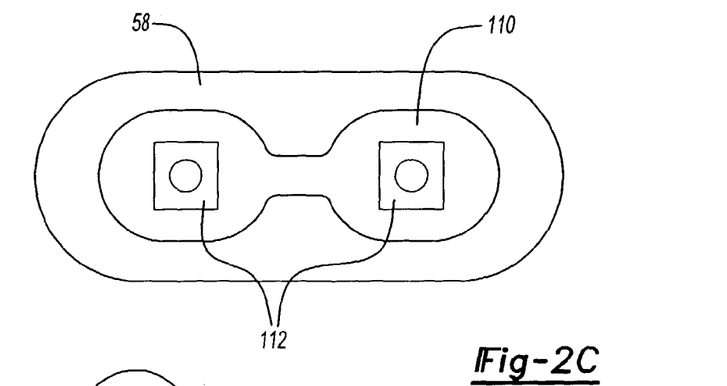
FIG. 2(c) illustrates a top view of another exemplary embodiment of a composite suitable for use with the structurally reinforced assembly of FIG. 2

In another alternative embodiment, and referring to FIG. 2(c), a plate 110 has been integrated into the reinforcement material 58. As shown, the plate 110 supports a pair of spacers 112. It is contemplated, however, that various portions of fasteners or fastening assemblies may be supported or attached to the plate 110 such as threaded members, hinge members, washers or the like.

As an example of one alteration that may be made to present invention, it is contemplated that various fastener assemblies may be utilized and that various functions of the fastener assemblies may be performed in various way with various components. For example, and without limitation, the spacer, the first and second threaded members, the hinge member or any combination thereof may be integrated together as a single unit. Alternatively, other components may used their place and may be integrated together as a single unit or may be separate fastenable components.

Figure 3:
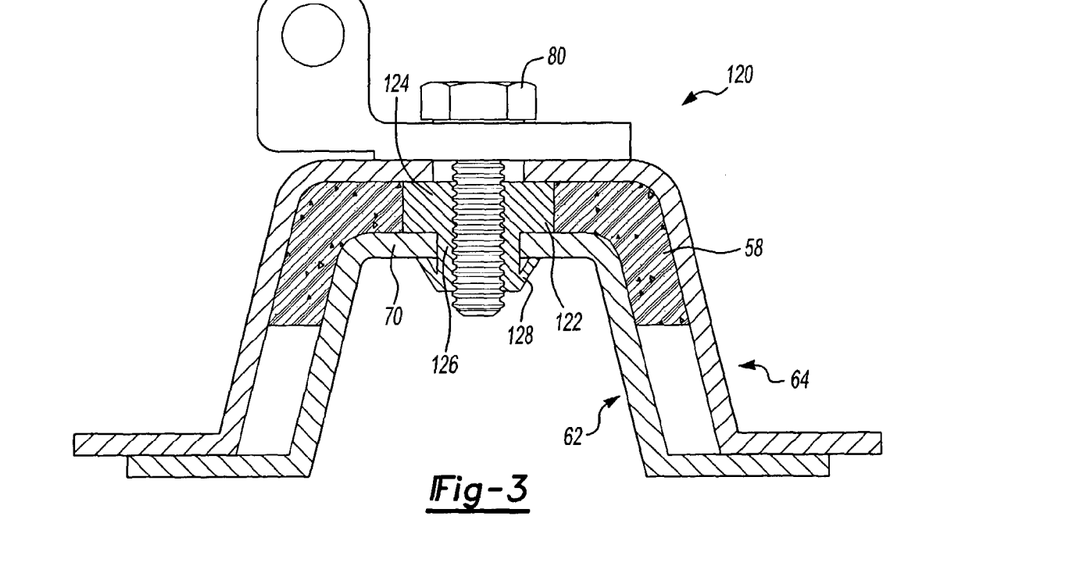
FIG. 3 illustrates a sectional view of another exemplary embodiment of a structurally reinforced assembly in accordance with an aspect of the present invention.
Figure 3A:
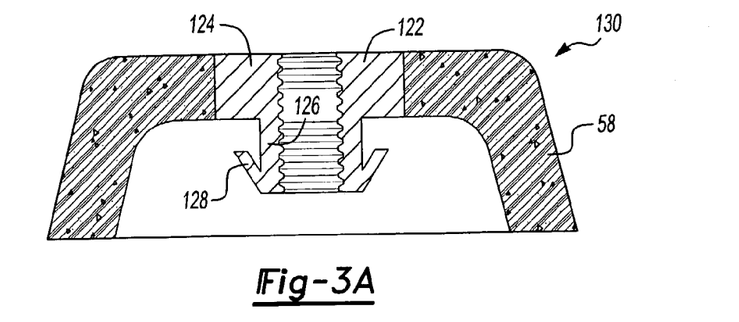
FIG. 3(a) illustrates a sectional view of an exemplary embodiment of a composite suitable for use with the structurally reinforced assembly of FIG. 3.

In FIGS. 3–3(a), an exemplary alternative reinforced structural assembly 120 is illustrated wherein the assembly 120 is substantially identical to the structural assembly 120 of FIG. 1 with the exception that the spacer 86 and the second threaded member 82 have been replaced by a threaded member 122 that includes a spacer 124 integrally formed with the threaded member 122. As shown, at least a portion of the spacer 124 of the threaded member 122 is positioned between the first and second members 62, 64 and a portion 126 of the threaded member 122 extends into an opening in the central wall 70 of the first member 62. Preferably, the threaded member 122 includes one or more protrusions 128 attached thereto or integrally formed therewith. Optionally, the threaded member 122 may be attached to the reinforcement material 58 to form a composite 130 as shown in FIG. 3(a).

During assembly, the portion 126 of the threaded member 122 is inserted into the opening in the central wall 70 of the first member 62 and the protrusions 128 of the member 122 flex toward the member 122 until the portion 126 extends through the central wall 70 and allow the protrusions 128 to extend away from the threaded member 122 and attach (e.g., interferingly fit) the threaded member 122 or the entire composite 130 to the first member 62. Thereafter, the second member 64 may be attached to the first member 62 such as by threadably attaching the first threaded member 80 to the threaded member 122 shown.

Figures 4A, 4B:
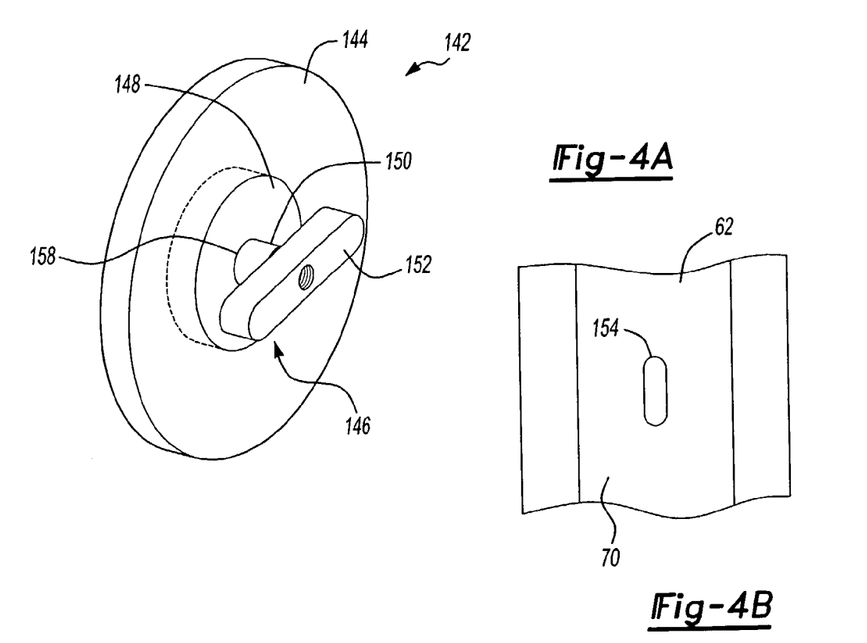
FIG. 4(a) illustrates a perspective view of an exemplary composite useful as a reinforcement of a structurally reinforced assembly.
FIG. 4(b) illustrates a bottom view of an exemplary member suitable for receipt of the composite of FIG. 4(a)
Figure 4C:
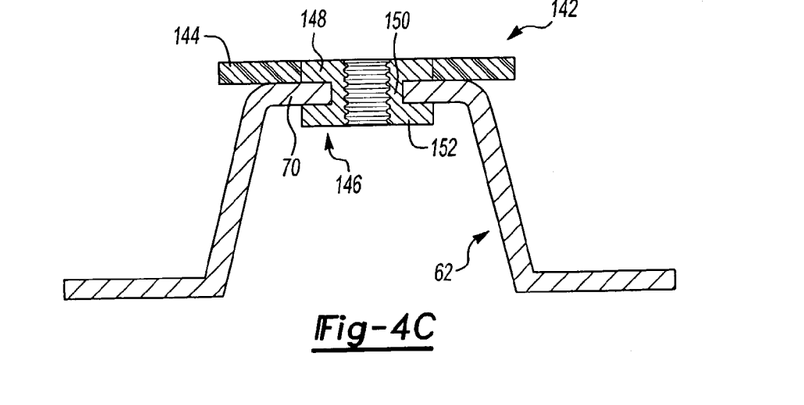
FIG. 4(c) illustrates a sectional view of the composite of FIG. 4(a) as applied to the member of FIG. 4(b)
Figure 4D:
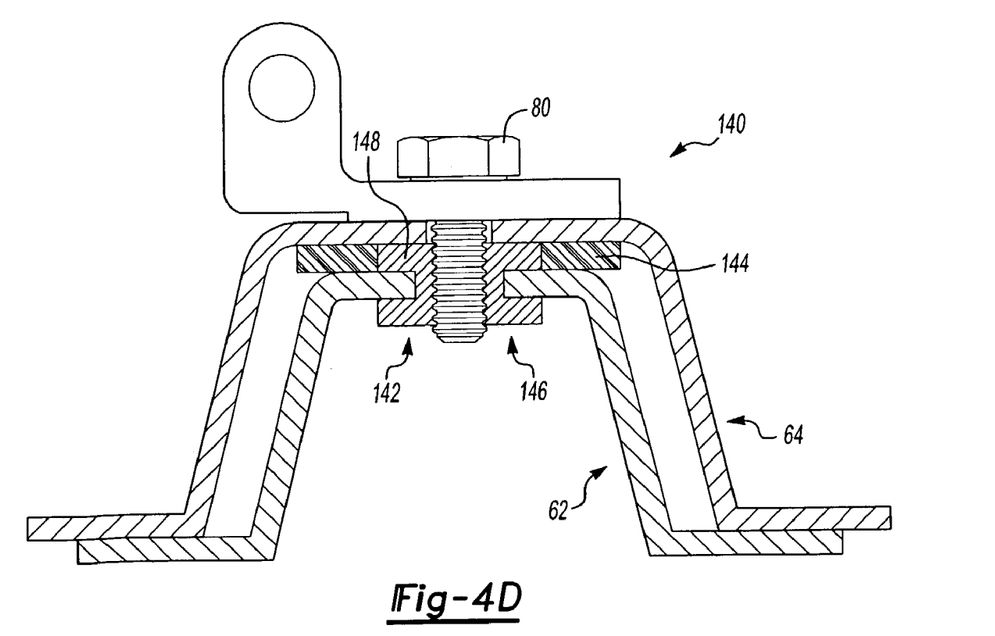
FIG. 4(d) illustrates a sectional view of an exemplary embodiment of a structurally reinforced assembly formed with the composite of FIG. 4(a)

In FIGS. 4(a)–4(d), there is illustrated the formation of another exemplary embodiment of a reinforced structural assembly 140 of the present invention. In FIG. 4(a), a composite 142 is illustrated wherein the composite 142 includes a reinforcement material 144 attached to a threaded member 146 that is integrally formed with a spacer 148. The threaded member 146 also includes a central portion 150 connecting the spacer 148 to an elongated portion 152. In FIG. 4(b), the first member 62 is shown with a slot 154 in its central wall 70. The composite 142 is assembled to the first member 62 by extending the elongated portion 152 into the slot 154 and through the central wall 70 of the first member 62 followed by rotating the threaded member 146, the composite 142 or both to attach (e.g., interferingly fit) the threaded member 146 or the entire composite 142 to the first member 62. In a highly preferred embodiment, the threaded member 146 includes a cam lock 158 for locking the threaded member 146 in place once it is rotated within the first member 62. The composite 142 is shown assembled to the first member 62 in FIG. 4(c). After assembly of the composite 142 to the first member 62, the reinforced structural assembly 140 may be formed by attaching the second member 64 to the first member 62 such as by threadably attaching the first threaded member 80 to the threaded member 146 shown.

Figure 5A:
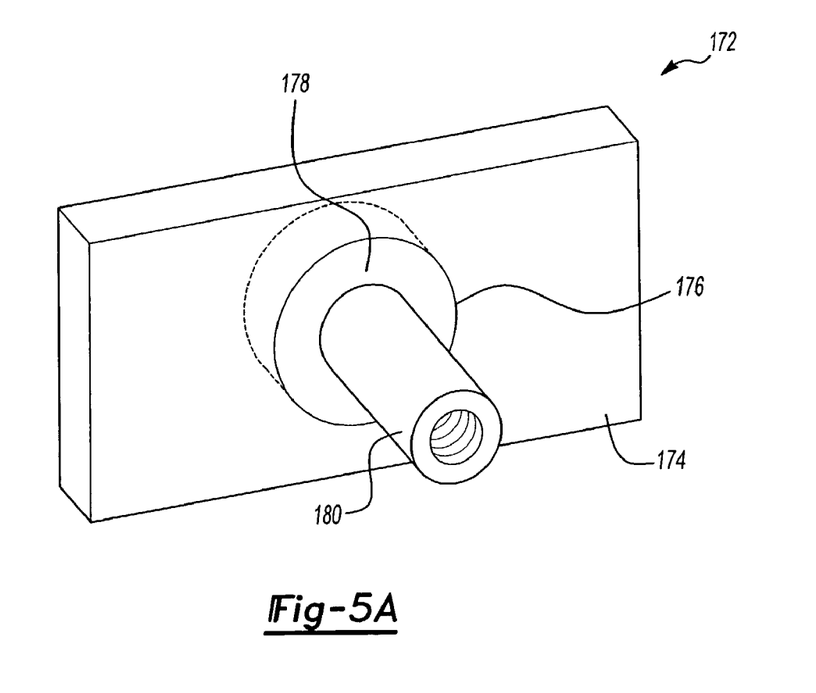
FIG. 5(a) illustrates a perspective view of a composition useful as a reinforcement of a structurally reinforced assembly.
Figure 5B:
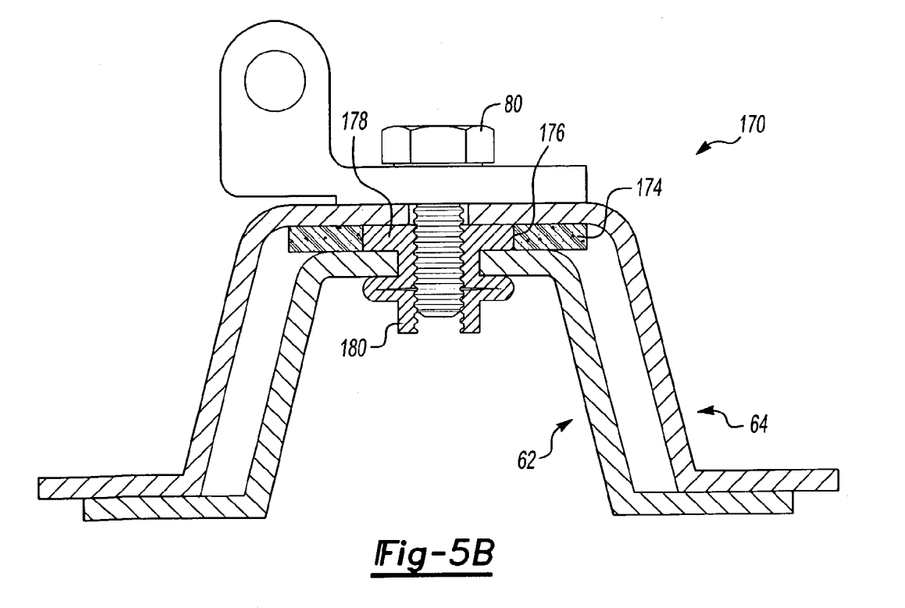
FIG. 5(b) illustrates a sectional view of an exemplary embodiment of a structurally reinforced assembly formed with the composite of FIG. 5(a)

In FIGS. 5(a) and 5(b), there is illustrated the formation of still another exemplary embodiment of a reinforced structural assembly 170 of the present invention. In FIG. 5(a), a composite 172 is illustrated wherein the composite 172 includes a reinforcement material 174 attached to a threaded member 176 that is integrally formed with a spacer 178. The threaded member 176 also includes a cylindrical portion 180. In FIG. 5(b), the composite 172 is applied to (e.g., layered upon) the first member 62 such that the cylindrical portion 180 extends through the opening in the central wall 70 of the first member 62. Thereafter, an annular protrusion 184 is formed (e.g., crimped) into the cylindrical portion 180 to attach (e.g., interferingly fit) the threaded member 176 or the entire composite 172 to the first member 62. After assembly of the composite 172 to the first member 62, the reinforced structural assembly 170 may be formed by attaching the second member 64 to the first member 62. The first and second members 62, 64 may be attached by threadably attaching the first threaded member 80 to the threaded member 176 shown.

Figure 6:
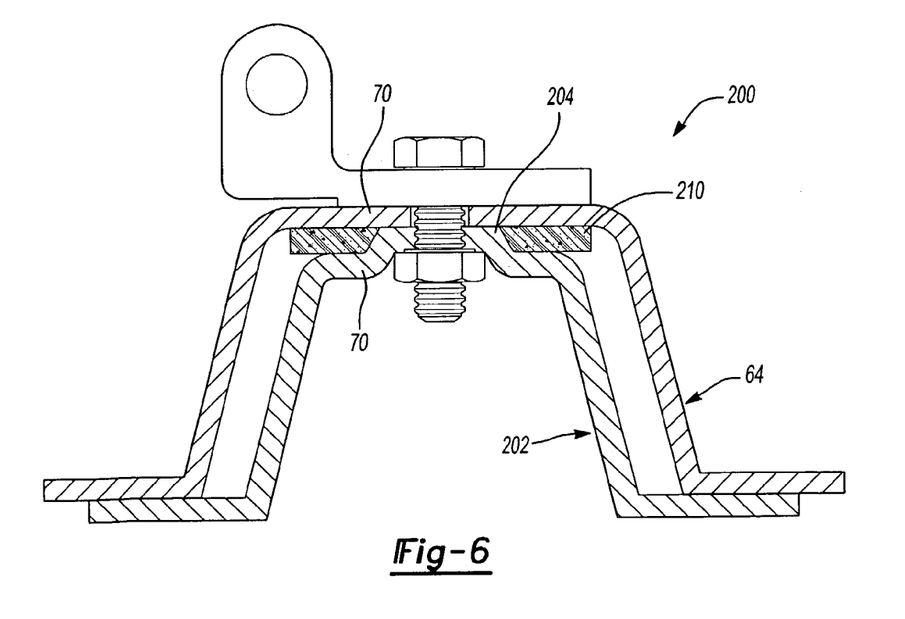
FIG. 6 illustrates a sectional view of an exemplary embodiment of a structurally reinforced assembly according another aspect of the present invention.

In FIG. 6, there is illustrated another exemplary embodiment of a reinforced structural assembly 200 of the present invention. In FIG. 6, the structural assembly 200 is substantially identical to the structural assembly 50 of FIG. 2 with the exception that first or inner member 62 and spacer 86 of FIG. 2 have been replaced with a first or inner member 202 having an integrated spacer 204 in FIG. 6. The spacer 204 is integrally formed with the first member 202 and extends outwardly away from the central wall 70 of the first member 202 to contact the central wall 72 of the second member 64. In turn, the spacer 204 maintains the central wall 70 of the first member 202 spaced apart from the central wall 70 of the second member 64 such that reinforcement material 210 may be disposed therebetween.

Figure 7A:
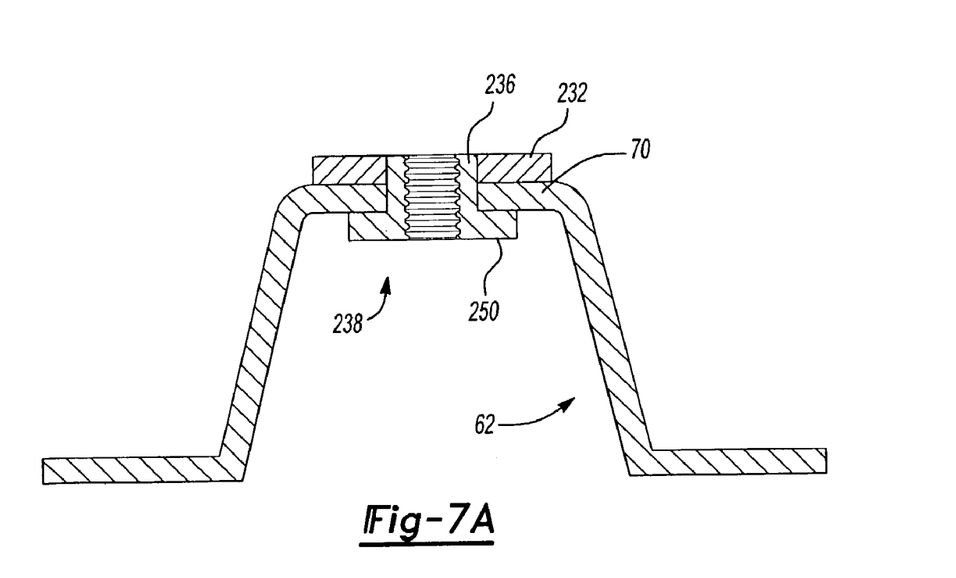
FIGS. 7(a)–7(b) illustrate a sectional views of the formation of another exemplary embodiment of a structurally reinforced assembly according to another aspect of the present invention.
Figure 7B:
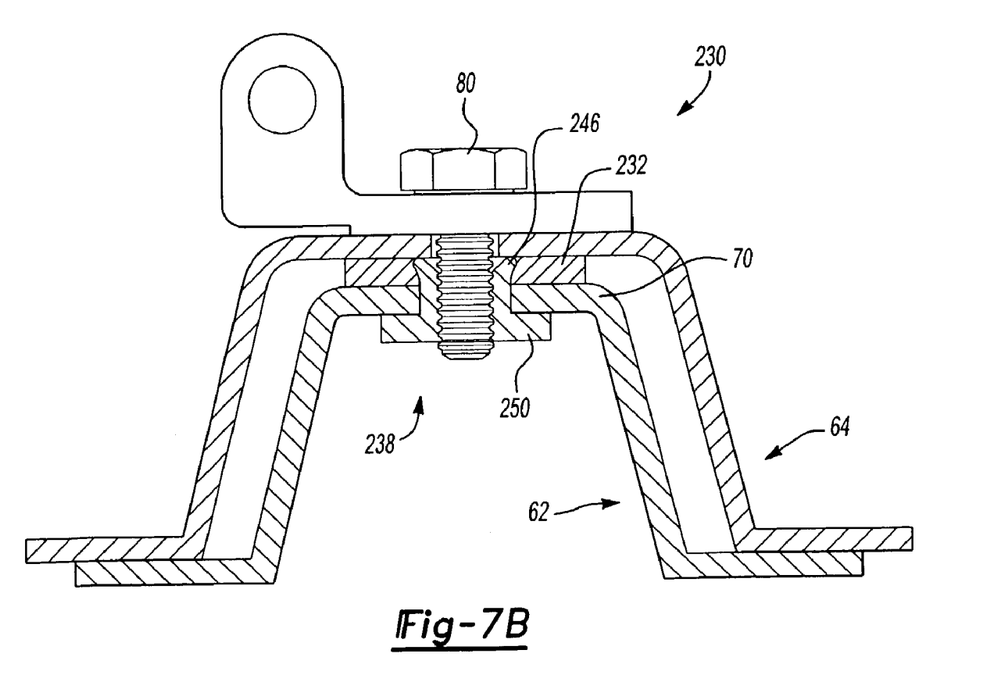

In FIGS. 7(a) and 7(b), there is illustrated the formation of still another exemplary embodiment of a reinforced structural assembly 230 of the present invention. In FIG. 7(a), reinforcement material 232 has been applied to (e.g., layered upon) the central wall 70 of the first member 62 such that through-holes of the wall 70 and reinforcement material 232 align. An annular portion 236 of a threaded member 238 has been extended through the through-holes of the wall 70 and the reinforcement material 232. To form the reinforced structural assembly 230 in FIG. 7(b), a tool may be used to crimp the annular portion 236 of the threaded member 238 radially outward to form a spacer 246 followed by attaching the second member 64 to the first member 62 with the reinforcement material 232 therebetween. Crimping the annular portion 236 to form the spacer 246 preferably interference fits the reinforcement material 232 and the first member 62 between the spacer 246 and a radially larger portion 250 of the threaded member 238. To complete formation of reinforced structural assembly 230, the first and second members 62, 64 are attached by threadably attaching the first threaded member 80 to the threaded member 238 shown.

Figure 8A:
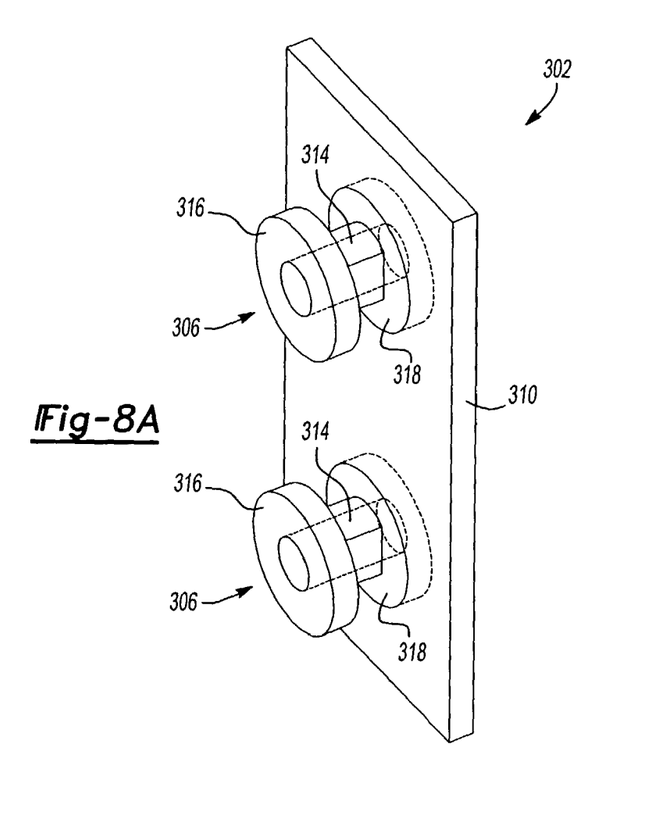
FIG. 8(a) illustrates a perspective view of an exemplary composite formed according to another aspect of the present invention.
Figure 8B:
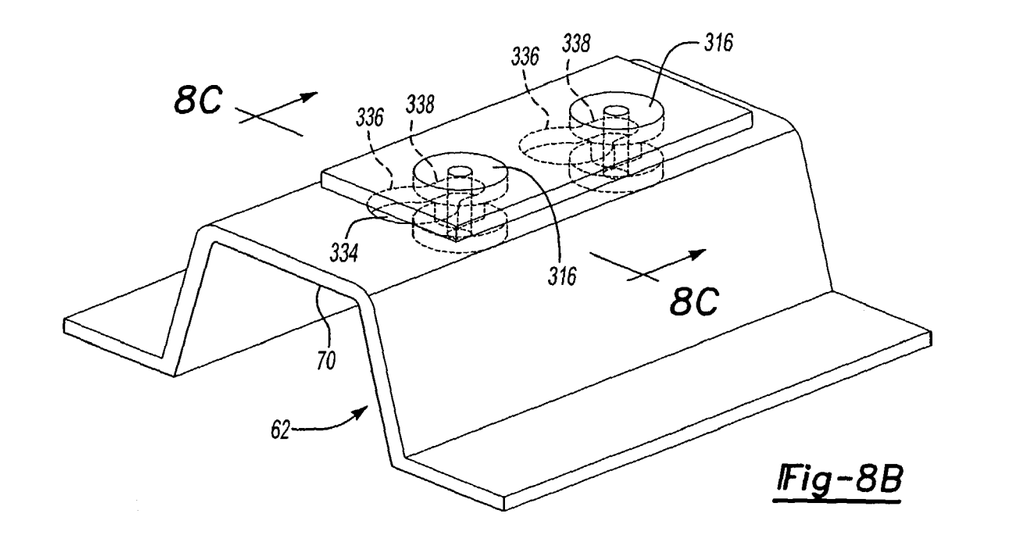
FIG. 8(b) illustrates a perspective view of the exemplary composite of FIG. 8(a) applied to an exemplary member.
Figure 8C:
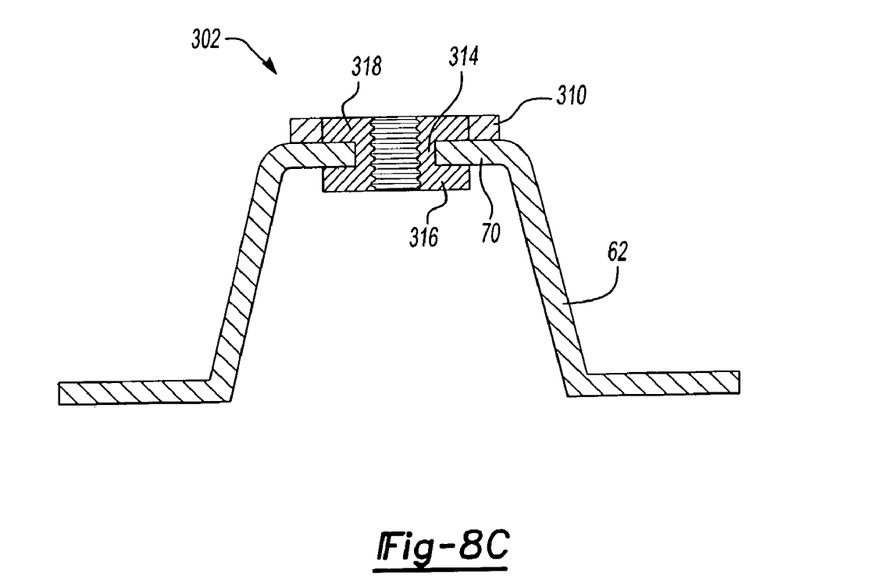
FIG. 8(c) illustrates a sectional view of the exemplary composite and the exemplary member of FIG. 8(b) taken along line 8C—8C.
Figure 8D:
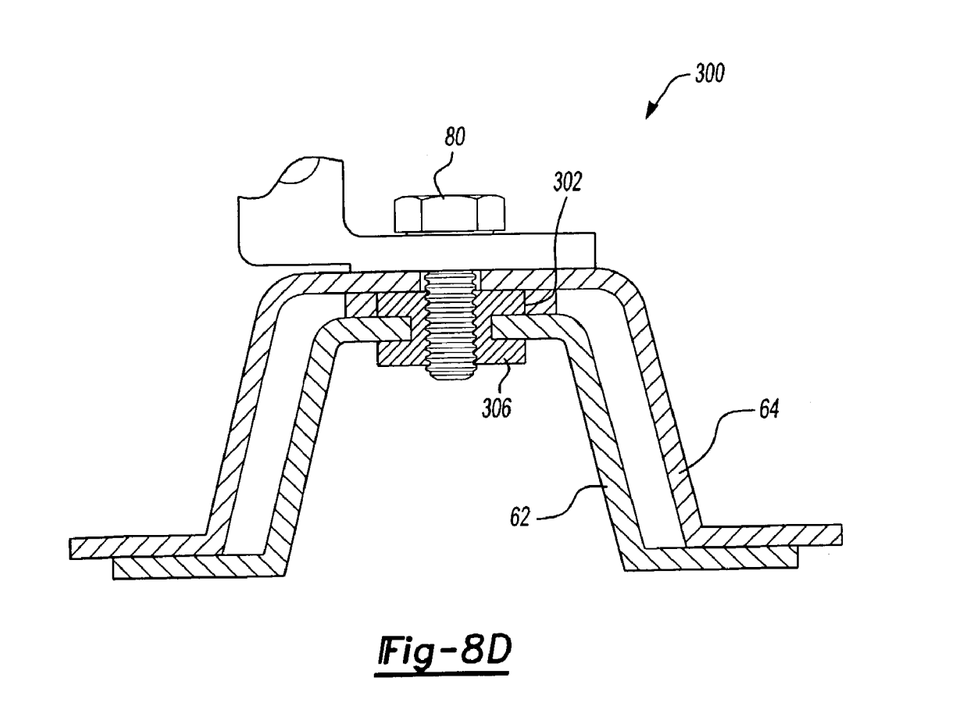
FIG. 8(d) illustrates a sectional view of another exemplary structurally reinforced assembly according to an aspect of the present invention.

In FIGS. 8(a)–8(d), there is illustrated the formation of yet another structurally reinforced assembly 300. In FIG. 8(a), there is illustrated a composite material 302 having a pair of threaded members 306 integrated with a reinforcement material 310. Each of the threaded members 306 includes a central rectangular portion 314 with a cylindrical portion 316 at one end and a spacer 318 at another end wherein the spacer 318 is integrated into the reinforcement material 310. In FIG. 4(b), the first member 62 is shown with a pair of through-holes 334 in its central wall 70, each of the through-holes 334 having a circular portion 336 and an extended open portion 338. The composite 302 is assembled to the first member 62 by extending the cylindrical portion 316 of the members 306 through the circular portions 336 of the through-holes 334 followed by lodging the rectangular portion 314 of the members 306 into the extended open portion 338 thereby interferingly fitting the members 306 and composite 302 to the member 62 and securing the members 306 against rotation. After assembly of the composite 302 to the first member 62, the reinforced structural assembly 300 may be formed by attaching the second member 64 to the first member 62 such as by threadably attaching the first threaded member 80 to the threaded member 146 shown.

A number of advantages are realized in accordance with the present invention, including, but not limited to, the ability to manufacture an integrated pillar structure ready for delivery and assembly at a vehicle assembly plant without the need for application of pumpable products, wet chemical products,.and multiple sets of tools, such as for other prior art.

The preferred embodiment of the present invention has been disclosed. A person of ordinary skill in the art would realize however, that certain modifications would come within the teachings of this invention. Therefore, the following claims should be studied to determine the true scope and content of the invention.

What is claimed is:

1. A reinforced structural assembly, comprising:
   a structural member including a first portion and a second portion defining a cavity therebetween;
   a fastener attached to the structural member, the fastener including a first member and a second member wherein the fastening of the first member of the fastener to the second member of the fastener provides a force urging the first portion of the structural member toward the second portion of the structural member across the cavity;
   a reinforcement material disposed in the cavity wherein the reinforcement material is activatable to expand and adhere to adjoining surfaces; and
   one or more spacers that maintain the first portion of the structural member spaced apart from the second portion of the structural member at a predetermined distance thereby assisting in supporting the first portion of the structural member and second portion of the structural member against the force provided by the fastener wherein loss of such support would otherwise lessen the ability of the fastener to remain attached to the structural member during activation and expansion of the reinforcement material.

2. A reinforced structural assembly as in claim 1, wherein the reinforcement material is adhered to the spacer prior to activation and expansion of the reinforcement material.

3. A reinforced structural assembly as in claim 1, wherein the spacer is integrally formed with the fastener.

4. A reinforced structural assembly as in claim 3, wherein the fastener includes a central portion extending through a slot in the first portion and the fastener includes an elongated portion attached to the central portion for interference fitting the fastener to the first portion.

5. A reinforced structural assembly as in claim 3, wherein the fastener includes an elongated cylindrical portion extending through an opening in the first portion of the structural member and wherein the elongated cylindrical portion is crimped for interference fitting the fastener to the first portion of the structural member.

6. A reinforced structural assembly as in claim 1, wherein the spacer is integrally formed with the first portion of the structural member and wherein the spacer extends outwardly from a central wall of the first portion to contact a central wall of the second portion.

7. A reinforced structural assembly as in claim 3, wherein the first portion of the structural member includes an opening with a circular portion and an extended open portion and the fastener includes a central rectangular portion attached to a cylindrical portion, the rectangular portion extending through the opening in the first portion and the cylindrical portion interference fitting the fastener to the first portion.

8. A reinforced structural assembly as in claim 1, wherein the one or more spacers includes a first and second spacer integral with the reinforcement material.

9. A reinforced structural assembly, comprising:
   a structural member including a first member and a second member defining a cavity therebetween;
   a fastener attached to the structural member, the fastener including a first threaded member threaded to a second threaded member, the fastener providing a force urging the first member of the structural member toward the second member of the structural member across the cavity thereby at least partially attaching the first member of the structural member to the second member of the structural member;
   a reinforcement material disposed in the cavity wherein the reinforcement material is activatable to expand and adhere to adjoining surfaces; and
   a spacer that maintains the first member of the structural member spaced apart from the second member of the structural member at a predetermined distance thereby assisting in supporting the first member of the structural member and second member of the structural member against the force provided by the fastener thereby allowing the reinforcement material to activate and expand while the first and second threaded members of the fastener maintain a substantially constant fastening torque.

10. A reinforced structural assembly as in claim 9, wherein the second threaded member is integrally formed with the spacer and further includes protrusions for interference fitting the second threaded member to the first member of the structural member.

11. A reinforced structural assembly as in claim 9, wherein the reinforcement material is adhered to the spacer prior to activation and expansion of the reinforcement material.

12. A reinforced structural assembly as in claim 10, wherein the second threaded member includes a central portion extending through a slot in the first member and the fastener includes an elongated portion attached to the central portion for interference fitting the fastener to the first member.

13. A reinforced structural assembly as in claim 10, wherein the second threaded member includes an elongated cylindrical portion extending through an opening in the first member of the structural member and wherein the elongated cylindrical portion is crimped for interference fitting the fastener to the first member of the structural member.

14. A reinforced structural assembly as in claim 9, wherein the spacer is integrally formed with the first member of the structural member and wherein the spacer extends outwardly from a central wall of the first member to contact a central wall of the second member.

15. A reinforced structural assembly as in claim 10, wherein the first member of the structural member includes an opening with circular portion and an extended open portion and the fastener includes a central rectangular portion attached to a cylindrical portion, the rectangular portion extending through the opening in the first member and the cylindrical portion interference fitting the fastener to the first member.

16. A reinforced structural assembly as in claim 10, wherein the one or more spacers includes a first and second spacer integral with the reinforcement material.

17. A reinforced structural assembly, comprising:
   a structural member including a first member and a second member defining a cavity therebetween, the structural member being a pillar structure of an automotive vehicle;
   a fastener attached to the structural member, the fastener including a threaded bolt threaded to a threaded nut, the fastener providing a force urging the first member toward the second member across the cavity thereby at least partially attaching the first member to the second member;
   a reinforcement material disposed in the cavity wherein the reinforcement material is activatable to expand and adhere to adjoining surfaces, the reinforcement material having an opening; and
   a spacer having an opening with at least a portion of the fastener extending therethrough, the spacer located in the opening of the reinforcement material, the spacer maintaining the first member of the structural member spaced apart from the second member of the structural member at a predetermined distance thereby assisting in supporting the first member of the structural member and second member of the structural member against the force provided by the fastener thereby allowing the reinforcement material to activate and expand while the first and second threaded members of the fastener maintain a substantially constant fastening torque.

18. A reinforced structural assembly as in claim 17, wherein the reinforcement material is adhered to the spacer prior to activation and expansion of the reinforcement material.

19. A reinforced structural assembly as in claim 17, wherein the spacer is integrally formed with the fastener.

20. A reinforced structural assembly as in claim 17, wherein the spacer is integrally formed with the first member of the structural member and wherein the spacer extends away from a central wall of the first member of the structural member to contact a central wall of the second member.

21. A reinforced structural assembly as in claim 10, wherein the first threaded member extends through the first member and the second member of the structural member.

* * * * *